(Model.)
C. W. LOVE.
TRACK CLEARER FOR MOWING MACHINES.
No. 260,581. Patented July 4, 1882.
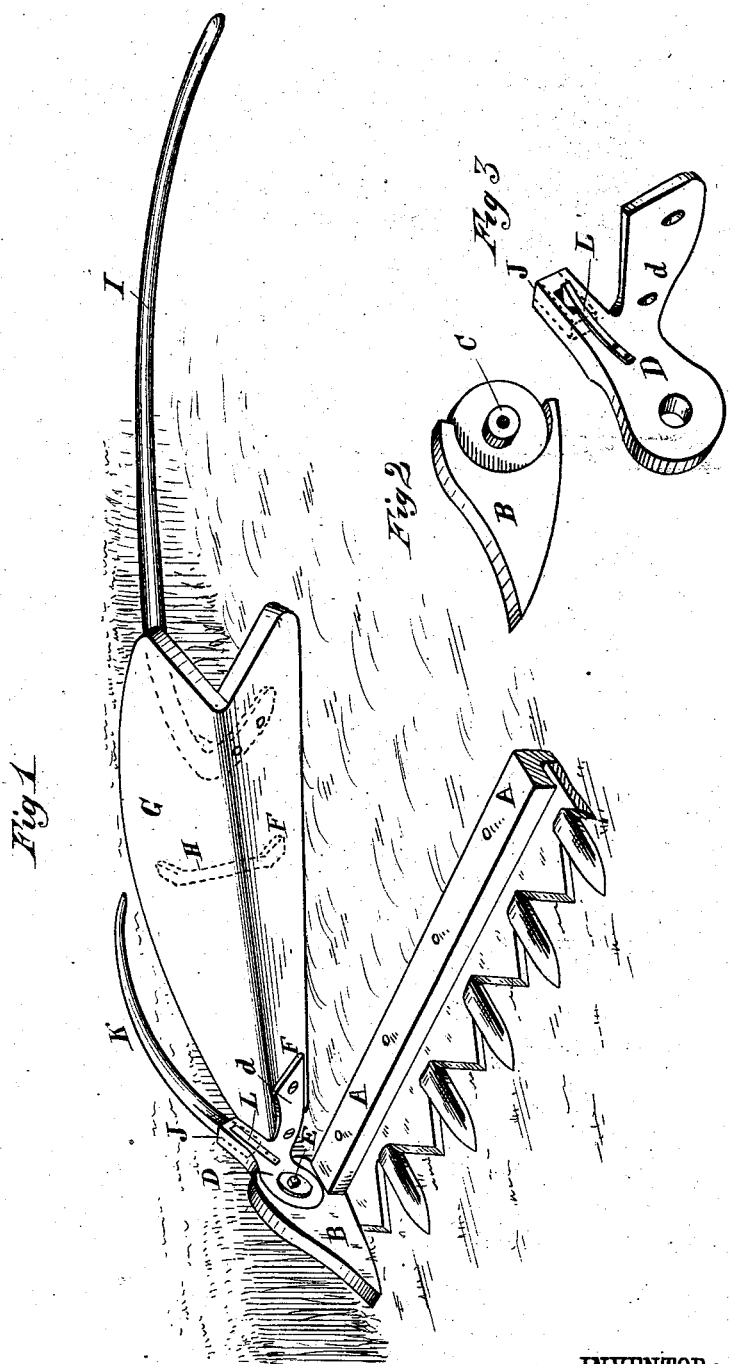
WITNESSES:
J. D. Garfield
C. Sedgwick
INVENTOR:
C. W. Love
BY Munn & Co
ATTORNEYS.

UNITED STATES PATENT OFFICE.

CHARLES W. LOVE, OF FAIRPOINT, OHIO.

TRACK-CLEARER FOR MOWING-MACHINES.

SPECIFICATION forming part of Letters Patent No. 260,581, dated July 4, 1882.

Application filed April 15, 1882. (Model.)

*To all whom it may concern:*

Be it known that I, CHARLES W. LOVE, of Fairpoint, Belmont county, Ohio, have invented a new and useful Improvement in Track-Clearers for Mowing-Machines, of which the following is a full, clear, and exact description.

Reference is to be had to the accompanying drawings, forming part of this specification, in which similar letters of reference indicate corresponding parts.

Figure 1 is a perspective view of my improvement, shown as applied to a mowing-machine finger-bar. Fig. 2 is a perspective view of the end shoe, and Fig. 3 is a perspective view of the coupling.

The object of this invention is to keep a narrow track along the edge of the standing grass free from cut grass to form a free passage-way for the inner shoe at the next round.

The invention consists in a track-clearer for mowing-machines constructed with a coupling hinged to the end shoe of the cutter-bar, and having attached to it two boards attached to each other at an angle and placed at an angle with the surface of the ground, the said track-layer being provided with two slightly-bent rods, one attached to the rear ends of the inclined boards and the other attached to the hinged coupling, whereby the cut grass will be moved back a little from the edge of the uncut grass and pressed down upon the stubble, as will be hereinafter fully described.

A is the finger-bar, and B is the outer or end shoe, of a mowing-machine. Upon the inner side of the rear end of the shoe B is cast a hub or hollow gudgeon, C, which passes through a hole in the forward end of the coupling D and serves as a journal for the said coupling D, hinging it to the shoe B. The coupling D is kept in place upon the hub C of the shoe B by a bolt, E, which passes through the shoe B and the hub C, and has a washer and nut placed upon its end. The rear end of the coupling D is forked or has an inwardly-projecting arm, d, to which is bolted the forward end of the board F.

The board F is placed at an angle of about forty-five degrees with the surface of the ground, and with its rear end inclined inward, so that the said board will force the cut grass downward upon the stubble and will slide over it. To the upper edge of the board F is attached the inner edge of the board G, which inclines upward toward its outer edge, so that any cut grass that falls upon the said board G will slide off at its inner or lower edge and will be pressed down by the board F.

The connection between the boards F G can be strengthened by one or more angular or other shaped braces, H, attached to their outer sides, as indicated in dotted lines in Fig. 1.

To the rear parts of the boards F G is attached the forward end of the long rod or finger I, which is made of such a length that its inner or rear end will be directly in the rear of the inner part of the cutter-bar A. The rod I is slightly curved inward and forward, and is designed to serve as a continuation of the boards F G and press down the cut grass in the rear of the inner part of the cutter-bar A.

In the upper rear corner of the coupling D is formed a socket, J, to receive the forward end of a rod, K, which is secured in the said socket J by a spring-catch, L, or other suitable fastening attached to the said coupling D, so that the rod K can be readily detached when not required for use. The rod K is curved downward and inward, and is designed to receive tall grass or weeds that would otherwise fall over the forward ends of the boards F G and guide the said grass or weeds to the board G, so that they will slide off the inner edge of the said board G and will be pressed down upon the stubble by the board F. The rod K may be permanently attached to the coupling D, if desired; but I prefer to make it detachable, so that it can be removed when not required for use, and can be readily replaced if broken. With this construction the forward parts of the boards F G will receive the grass cut by the outer end of the cutter-bar A and will move it inward a little before it is pressed down by the inclined board F, so that there will be along the edge of the uncut grass a space of a few inches free from cut grass to serve as a track for the inner end of the cutter-bar at the next round.

The manner of attaching the hinge or coupling D of my track-layer to the cutter-bar of a mowing-machine, as herein described, may be varied to suit the construction of the cutter-bars of differently-made mowers.

I am aware that it is not new to have a divider-section connected with a guard-shoe by an eccentric-bolt, or to have the lower end of a dividing-board turned in on the inside and extending in the rear of board for use with the usual rods on the inside of board and an additional rod on the outside, so as to lift and throw back the overhanging grass from the swath; but

What I claim as new is—

1. A mowing-machine track-clearer having a coupling hinged to the end shoe of the finger-bar, two boards at an angle to each other and to the ground, and two slightly-bent rods, one attached to the rear of inclined boards and the other to the hinged coupling, as shown and described.

2. The combination, with the hinged coupling D, having an inwardly-projecting arm, of the board F, bolted at its forward end to said arm, placed at an angle of about forty-five degrees to the surface, and inwardly inclined, as shown and described.

3. The combination, with the board F, arranged as described, of a board, G, inclined upwardly toward its outer edge, as and for the purpose set forth.

4. The combination, with the boards F G, arranged as described, of the two curved rods I K, one attached to the rear of boards and the other to the hinged coupling D, as shown and described.

CHARLES WHITE LOVE.

Witnesses:
W. S. KENNON,
JAMES F. CHARLESWORTH.